United States Patent
Song et al.

(10) Patent No.: US 9,785,575 B2
(45) Date of Patent: Oct. 10, 2017

(54) OPTIMIZING THIN PROVISIONING IN A DATA STORAGE SYSTEM THROUGH SELECTIVE USE OF MULTIPLE GRAIN SIZES

(71) Applicant: INTERNATIONAL BUSINESS MACHINES CORPORATION, Armonk, NY (US)

(72) Inventors: Cheng-Chung Song, Tucson, AZ (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 14/586,219

(22) Filed: Dec. 30, 2014

(65) Prior Publication Data
US 2016/0188211 A1    Jun. 30, 2016

(51) Int. Cl.
G06F 3/06 (2006.01)
G06F 12/109 (2016.01)
G06F 12/02 (2006.01)

(52) U.S. Cl.
CPC .......... *G06F 12/109* (2013.01); *G06F 3/0608* (2013.01); *G06F 3/0631* (2013.01);
(Continued)

(58) Field of Classification Search
CPC .... G06F 3/0628–3/0689; G06F 3/0608; G06F 2211/1021; G06F 2211/1026
See application file for complete search history.

(56) References Cited

U.S. PATENT DOCUMENTS

| | | | |
|---|---|---|---|
| 6,487,633 B1 * | 11/2002 | Horst | G06F 3/061 |
| | | | 711/112 |
| 7,694,072 B2 | 4/2010 | Nehse | |

(Continued)

FOREIGN PATENT DOCUMENTS

| | | |
|---|---|---|
| EP | 726514 A2 | 8/1996 |
| WO | 2011153478 A1 | 12/2011 |

(Continued)

OTHER PUBLICATIONS

Feng Chen, B. E. "On performance optimization and system design of flash memory based solid state drives in the hierarchy." PhD diss., The Ohio State University, 2010.

(Continued)

*Primary Examiner* — Nicholas Simonetti
(74) *Attorney, Agent, or Firm* — Brian F. Russell; Randall J. Bluestone

(57) ABSTRACT

A data storage system includes a pre-cache and a plurality of storage devices across which a data storage array is distributed. In response to receipt of a write request specifying a logical address and write data, the data storage system buffers the write request among a plurality of write requests in the pre-cache without provisioning in the data storage array a physical extent corresponding to the logical address. A management node analyzes the plurality of write requests buffered in the pre-cache. In response to the analyzing identifying a first pattern of write requests, the management node provisions, in the data storage array, a first physical extent having a smaller grain size and destages the write data to the first physical extent. In response to the analyzing identifying a second pattern of write requests, the management node provisions a second physical extent having a larger grain size and destages the write data from the pre-cache to the second physical extent.

26 Claims, 7 Drawing Sheets

(52) U.S. Cl.
CPC .......... *G06F 3/0665* (2013.01); *G06F 3/0688* (2013.01); *G06F 3/0689* (2013.01); *G06F 12/0246* (2013.01); *G06F 2211/1021* (2013.01); *G06F 2212/7201* (2013.01)

(56) References Cited

U.S. PATENT DOCUMENTS

| | | | |
|---|---|---|---|
| 7,711,897 B1 | 5/2010 | Chatterjee et al. | |
| 7,802,063 B1 | 9/2010 | Chatterjee et al. | |
| 8,090,981 B1 | 1/2012 | Kalman et al. | |
| 8,127,096 B1 | 2/2012 | Chatterjee et al. | |
| 8,595,461 B2 | 11/2013 | Helman et al. | |
| 8,612,719 B2 | 12/2013 | Givargis et al. | |
| 8,745,344 B2 | 6/2014 | Kito et al. | |
| 8,793,462 B2 | 7/2014 | Bakke et al. | |
| 8,806,154 B1 | 8/2014 | Gupta et al. | |
| 2002/0103980 A1* | 8/2002 | Crockett | G06F 3/0608 711/162 |
| 2002/0188801 A1* | 12/2002 | Green | H04L 67/2885 711/113 |
| 2007/0106841 A1* | 5/2007 | Stewart | G06F 3/0607 711/112 |
| 2008/0229048 A1* | 9/2008 | Murase | G06F 3/0607 711/171 |
| 2010/0088485 A1 | 4/2010 | Ikeda et al. | |
| 2011/0191558 A1* | 8/2011 | Anderson | G06F 12/16 711/162 |
| 2012/0324176 A1* | 12/2012 | Bohling | G06F 3/0608 711/154 |
| 2013/0067159 A1 | 3/2013 | Mehra | |
| 2013/0067187 A1 | 3/2013 | Moss et al. | |
| 2013/0067273 A1 | 3/2013 | Fiske et al. | |
| 2014/0032837 A1* | 1/2014 | Nagasaki | G06F 3/0605 711/114 |
| 2014/0101376 A1 | 4/2014 | Flynn et al. | |
| 2014/0136886 A1 | 5/2014 | Petrocelli | |
| 2014/0181369 A1 | 6/2014 | Horn | |
| 2014/0208017 A1 | 7/2014 | Benhase et al. | |
| 2014/0211602 A1 | 7/2014 | Hetzler et al. | |
| 2015/0242133 A1* | 8/2015 | Smith | G06F 3/0613 711/114 |
| 2015/0277802 A1* | 10/2015 | Oikarinen | G06F 3/0631 711/114 |

FOREIGN PATENT DOCUMENTS

| | | |
|---|---|---|
| WO | 2013154804 A1 | 10/2013 |
| WO | 2014105228 A1 | 7/2014 |

OTHER PUBLICATIONS

Jeremic, Nikolaus, et al;. "Operating system support for dynamic over-provisioning of solid state drives", In Proceedings of the 27th Annual ACM Symposium on Applied Computing, pp. 1753-1758. ACM, 2012.

Hai Jin et al., "Stripped mirroring RAID architecture", 2000 Elsevier.

Lee et al., Advances in Flash Memory SSD Technology for Enterprise Database Applications, SIGMOD'09, Jun. 29-Jul. 2, 2009.

Maruthachalam et al., A Distributed System Design for Next Generation Storage and Remote Replication, Storage R&D Lab, HP India Software Operations, Bangalore, India, 2014.

\* cited by examiner

OPTIMIZING THIN PROVISIONING IN A DATA STORAGE SYSTEM THROUGH SELECTIVE USE OF MULTIPLE GRAIN SIZES

BACKGROUND OF THE INVENTION

This disclosure relates to data processing and storage, and more specifically, to data storage systems, such as flash memory systems, that employ thin provisioning. Still more particularly, this disclosure is directed to optimizing thin provisioning in a data storage system through selective use of multiple grain sizes.

NAND flash memory is an electrically programmable and erasable non-volatile memory technology that stores one or more bits of data per memory cell as a charge on the floating gate of a transistor. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access the memory cells, flash memory arrays can generally be programmed on a page basis, but are erased on a block basis.

In data storage systems employing NAND flash memory and/or other storage technologies such as magnetic hard disk drives (HDDs), the availability and performance of the data storage system is often enhanced by employing some level of data redundancy. For example, data storage systems often employ one or more arrangements (often referred to as "levels") of redundant array of inexpensive (or independent) disks (RAID). Commonly employed RAID levels include RAID 0, which employs data striping across a set of RAID disks; RAID 1, which involves mirroring of RAID disks; RAID 4, which implements block-level striping across RAID disks and a dedicated parity drive; RAID 5, which implements block-level striping across RAID disks and distributed storage of parity information; and RAID 6, which implements block-level striping across RAID disks and distributed storage of two independent sets of parity information. The data redundancy provided by the various RAID levels allow the data storage system to recover from various modes of failure, thus improving data availability and storage system reliability.

Thin provisioning is also an important feature in modern data storage systems. Thin provisioning allocates physical storage from a data storage system only as it is needed (i.e., when data associated with a logical address is first written). Thus, instead of allocating physical storage for an entire logical volume at the same time (e.g., when the logical volume is created), individual extents of the logical volume are provisioned in response to accesses to the extents. By reserving portions of physical storage until needed, thin provisioning enables a given amount of physical storage to support a logical storage capacity that is larger than the physical storage capacity that is actually available in the data storage system.

In operation, a sequential write operation is often accomplished by issuing write input/output operations (IOPs) from multiple different software threads executing on a host to the data storage system. The present disclosure recognizes that because the write IOPs are issued from multiple different software threads and may be received by the data storage system in a non-sequential order, the write IOPs will not necessarily appear to be fully sequential to the data storage system. If the data storage system employs thin provisioning, the data storage system may provision physical storage in response to the write IOPs in non-contiguous regions of the address space. The allocation of non-contiguous regions of the address space can lead to inefficiencies in the data storage system.

Further, if the data storage system employs data striping such as that used in RAID 4, RAID 5 or RAID 6, writing a full stripe at a time is preferred. Writing full stripes rather than partial stripes is preferred because partial stripe writes require multiple operations to extract the old data and parity from a stripe, combine the old and new data, and then write the new data and new parity to the stripe. For RAID arrays having wide stripes, a large amount of data must be transferred sequentially to form an entire RAID stripe. In such cases, if thin provisioning employs address space extents smaller than a full stripe, then all or most of the address space may be allocated in a way that prevents full stripe writes.

U.S. Pat. No. 7,802,063 discloses thin provisioning in a data storage system employing RAID. At col. 9, lines 11-31, U.S. Pat. No. 7,802,063 discloses:

> As shown in FIG. 4, the available physical capacity of the computer 2 is made up of a number of hard disk drives 4A-4D. The available physical capacity is divided into a number of unique, equally sized areas, called territories. The available physical capacity is further subdivided into units referred to herein as provisions. Provisions comprise unique, equally sized areas of the available physical capacity and are smaller in size than the territories. In particular, according to a preferred embodiment, the provisions are one megabyte ("MB") in size while territories are one gigabyte ("GB") in size. Accordingly, each territory includes one thousand and twenty-four provisions. It should be appreciated that provisions of other sizes may also be utilized, and multiple provision and territory granularities may coexist in the same server. By subdividing the available physical capacity of the computer 2 into areas of different sizes, the territories and provisions, the physical capacity may be provisioned in units of different sizes when appropriate. Capacity may be provisioned in units of territories in response to new writes being received at a logical volume. Capacity may alternately be allocated in units of provisions when appropriate.

U.S. Pat. No. 7,802,063 further discloses a technique for write gathering at col. 14, line 39 through col. 15, line 16, stating:

> In a system that utilizes thin provisioning together with RAID, however, regardless of the randomness in the order in which new write requests are received by the server, the allocation of provisions, and consequently the arrangement of the data on the RAID array, is sequential. Hence, a cache on the physical LBA level is always guaranteed to collect new I/O operations together into sequential stripes, which may be written without incurring a RAID 5 write penalty.

However, U.S. Pat. No. 7,802,063 does not address when allocation of the different sizes of units of physical capacity are appropriate. Further, according to the technique of thin provisioning disclosed in U.S. Pat. No. 7,802,063, the physical capacity is allocated when new writes are received at a logical volume. The present disclosure recognizes that performance of a data storage system employing thin provisioning and data redundancy can be optimized by intelligently allocating varying grain sizes of physical capacity after new writes are received based on analysis of access patterns.

BRIEF SUMMARY

In at least one embodiment, a data storage system includes a pre-cache and a plurality of storage devices across which a data storage array is distributed. In response to receipt of a write request specifying a logical address and write data, the data storage system buffers the write request among a plurality of write requests in the pre-cache without provisioning in the data storage array a physical extent corresponding to the logical address. A management node analyzes the plurality of write requests buffered in the pre-cache. In response to the analyzing identifying a first pattern of write requests, the management node provisions, in the data storage array, a first physical extent having a smaller grain size and destages the write data to the first physical extent. In response to the analyzing identifying a second pattern of write requests, the management node provisions a second physical extent having a larger grain size and destages the write data from the pre-cache to the second physical extent. By thin provisioning in this manner, the grain size employed is optimized for the patterns of writes that are actually observed.

In at least one embodiment, the first pattern of write requests includes a plurality of write requests that are identified as having a small amount of write data and that target non-contiguous logical addresses. Thus, when provisioning of large extents is not advantageous, the management node allocates small physical extents.

In at least one embodiment, the second pattern includes a plurality of write requests that are identified as having a small amount of write data and that target contiguous logical addresses. Thus, when provisioning of large extents is advantageous, the management node allocates large physical extents.

In at least some embodiments, prior to provisioning the second physical extent, data stored within one or more previously provisioned physical extents having the smaller grain size are relocated within the data storage array, such that physical storage within the one or more previously provisioned physical extents can be included within the second physical extent. In this manner, provisioning of large physical extents is advantageously enabled.

In at least one embodiment, the data storage system stripes data stored within the data storage array across the plurality of storage devices, and the larger grain size is selected to be at least as large as a size of a data stripe within the data storage array. Consequently, large grain extents can be written to the data array as full data stripes.

DETAILED DESCRIPTION

Figure 1A:
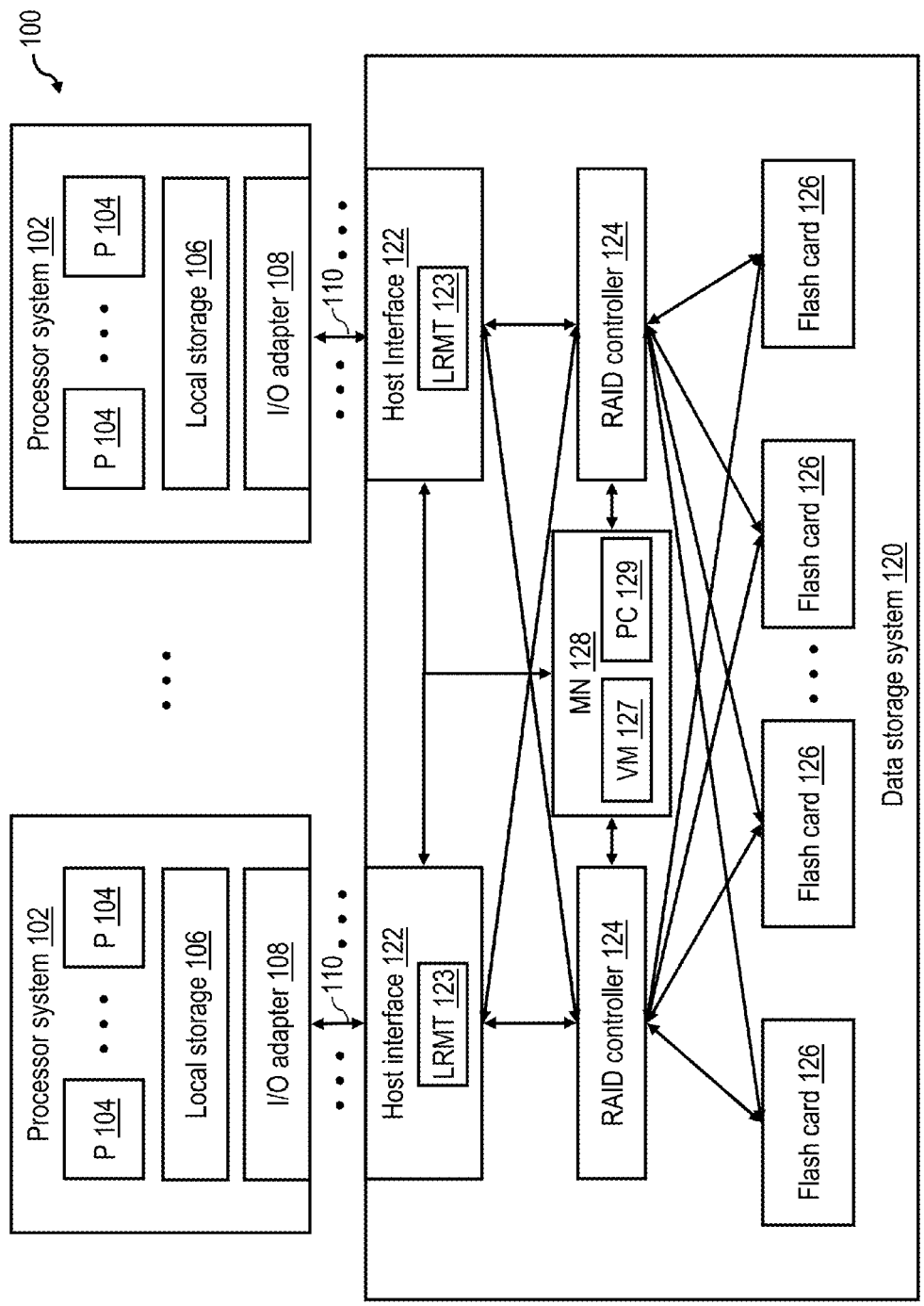
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as one or more processor systems 102 each having one or more processors 104 that process instructions and data. In various implementations, one or more of processors 104 may execute instructions of application, middleware and/or operating system software in one or more simultaneously executing threads. Each processor system 102 may additionally include local storage 106 (e.g., dynamic random access memory (DRAM) or hard disk drives) that may store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, PowerPC, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), Infini-Band, Transport Control Protocol/Internet Protocol (TCP/IP), Peripheral Component Interconnect Express (PCIe), etc. I/O operations (IOPs) communicated via I/O channel(s) 110 include read IOPs by which a processor system 102 requests data from data storage system 120 and write IOPs by which a processor system 102 requests storage of data in data storage system 120.

In one embodiment, an IOP received by data storage system 120 from a host device, such as a processor system 102, specifies a transaction type (e.g., read or write), the target logical block address (LBA) at which the data is to be accessed (read or written) and, if a write IOP, additionally specifies the write data to be stored to data storage system 120. The IOP may also specify the amount (or size) of the data to be accessed. Other information may also be communicated depending on the protocol and features supported by I/O channels 110 and data storage system 120. In a preferred embodiment described in greater detail below, the logical address space composed of the LBAs referenced by the IOPs are organized in logical units, each of which is uniquely identified by a logical unit number (LUN) and each of which can be presented to the software executed by hosts as one or more logical volumes. In this preferred embodiment, IOPs further specify the LUN of the target logical unit to be accessed.

In the illustrated embodiment, data storage system 120 includes one or more host interfaces 122 through which data storage system 120 receives and responds to IOPs via I/O channels 110. Each host interface 122, which can be implemented by an interface card or a processing node equivalent to a processor system 102, includes a logical address translation facility, referred to herein as a logical unit-to-RAID mapping table (LRMT) 123. LRMTs 123, which are synchronized between host interfaces 122, translate the logical unit LBAs specified by read and write IOPs into RAID LBAs employed internally to data storage system 120. Thus, LRMTs 123 provide a first level of logical-to-logical address translation.

The one or more host interfaces 122 are coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, alternative and/or additional non-volatile storage devices can be employed. RAID controllers 124 implement one or more levels of RAID (e.g., RAID 5, RAID 6, and/or a hybrid RAID level) over flash cards 126.

In the depicted embodiment, the operation of data storage system 120 is managed by a management node 128, which is coupled (e.g., by one or more PCIe buses) to host interfaces 122 and to RAID controllers 124. In various embodiments, management node 128 can be implemented as a component of data storage system 120 or external to data storage system 120. In one embodiment, management node 128 can be implemented with a node equivalent to the processor systems 102 described above. In the illustrated embodiment, management node 128 implements a volume manager 127, which can be implemented, for example, in firmware and/or operating system and/or device driver software. In other embodiments, volume manager 127 can be distributed across management node 128 and/or other nodes in a distributed fashion. As described in greater detail below, management node 128 also includes a pre-cache (PC) 129 that temporarily buffers data of write IOPs in advance of provisioning of physical storage for storing the write data. In one embodiment, pre-cache 129 can be implemented in battery-backed memory, and may further be mirrored for improved availability and fault tolerance.

Figure 1B:
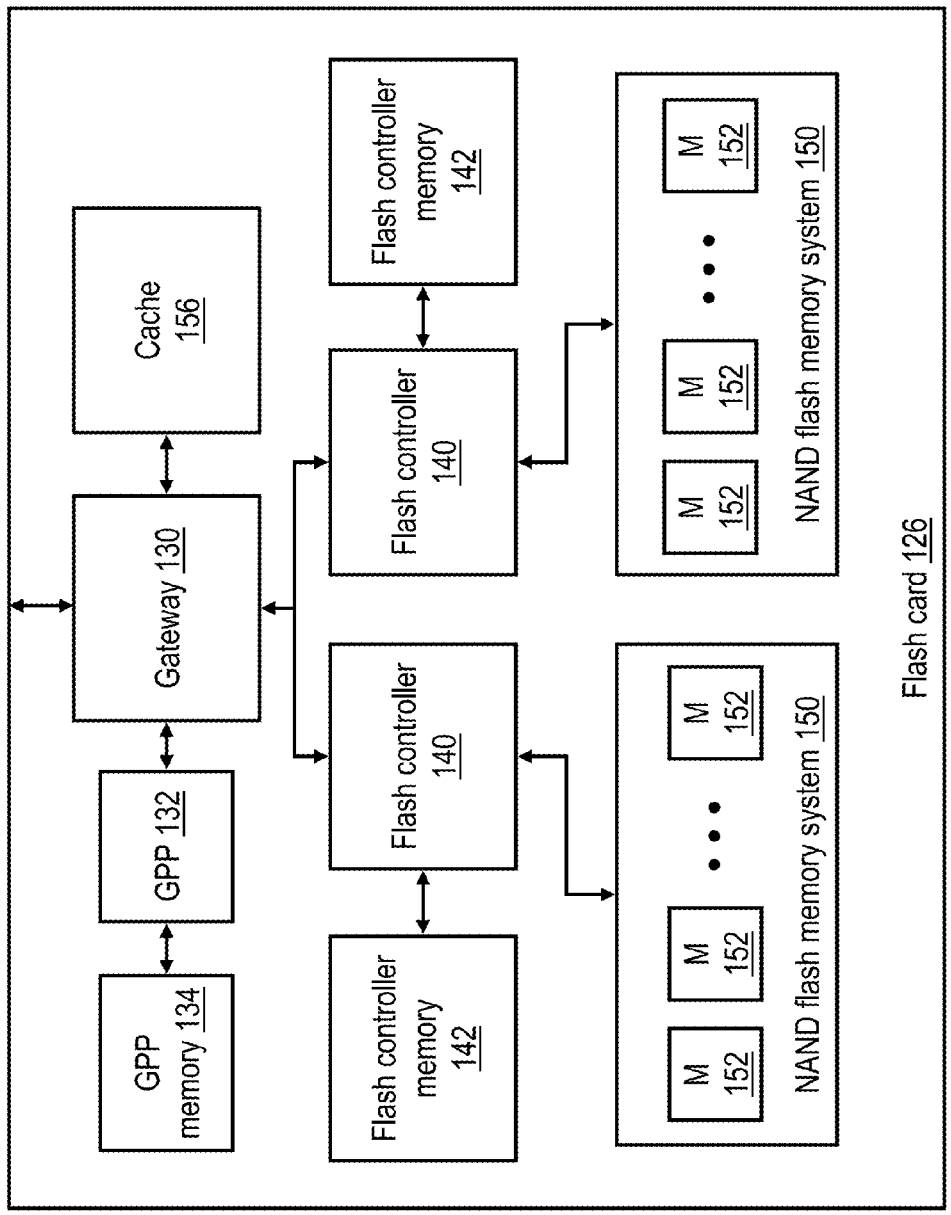
FIG. 1B is a more detailed block diagram of a flash card of the data storage system of FIG. 1A.

FIG. 1B depicts a more detailed block diagram of an exemplary embodiment of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on IOPs received by gateway 130 and/or to schedule servicing of the IOPs by flash card 126. GPP 132 is coupled to a GPP memory 134 (e.g., Dynamic Random Access Memory (DRAM)) that can conveniently buffer data created, referenced and/or modified by GPP 132 in the course of its processing.

Gateway 130 is further coupled to multiple flash controllers 140, each of which controls a respective NAND flash memory system 150. Flash controllers 140 can be implemented, for example, by an Application Specific Integrated Circuit (ASIC) or Field Programmable Gate Array (FPGA)) having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory system 150 to read or write the requested data from or into NAND flash memory system 150 or by accessing a memory cache (not illustrated) associated with NAND flash memory system 150.

Flash controllers 140 implement a flash translation layer (FTL) that provides logical-to-physical address translation to enable access to specific memory locations within NAND flash memory systems 150. The flash translation layer translates RAID LBAs into a physical addresses assigned to corresponding physical location in NAND flash memory systems 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. In the embodiment shown in FIG. 1B, each NAND flash memory system 150 includes multiple (e.g., 32) individually addressable NAND flash memory storage devices 152. In the illustrated example, the flash memory storage devices 152 take the form of a board-mounted flash memory modules, for example, Single Level Cell (SLC), Multi-Level Cell (MLC), Three Level Cell (TLC), or Quad Level Cell (QLC) NAND flash memory modules.

Within these flash memory modules, the memory cells are physically arranged in multiple blocks, each in turn including multiple physical pages. As is known to those skilled in the art, NAND flash memory must be erased prior to being programmed. Further, NAND flash memory is generally constrained by its construction such that the smallest granule of storage that can be erased is a block and the smallest granule of storage that can be accessed by a read or write IOP is fixed at the size of a single physical page. It should be appreciated in this regard that the logical unit LBAs provided by host devices correspond to logical pages within the logical address space, where each logical page typically has a size of 4 kilobytes. Physical pages, in contrast, typically have a larger size, for example, 16 kilobytes (kB), and can thus correspond to multiple logical pages.

As further shown in FIG. 1B, flash cards 126 may optionally further include a cache 156 that can used to buffer frequently and/or recently accessed physical pages. In order to achieve low access latencies, cache 156 frequently is sized to provide a significantly smaller storage capacity than NAND flash memory systems 150. In at least some embodiments, cache 156 may also be implemented in a different memory technology than NAND flash memory systems 150, such as dynamic random access memory (DRAM) or static random access memory (SRAM).

Having described the general physical structure of one exemplary embodiment of a data storage system 120, certain operational aspects of data storage system 120 are now described with reference to FIG. 2, which is a high level flow diagram of the flash management functions and data structures employed by a GPP 132 and/or flash controller 140 in accordance with one embodiment.

Data storage system 120 does not generally allow external devices to directly address and/or access the physical memory locations within NAND flash memory systems 150. Instead, data storage system 120 is generally configured to present a single contiguous logical address space to the external devices, thus allowing host devices to read and write data to and from LBAs within the logical address space while permitting one or more of the various levels of controllers (e.g., management node 128, RAID controllers 124, flash controllers 140 and GPPs 132) to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 performs logical-to-physical address translation using a logical-to-physical address translation data structure, such as logical-to-physical translation (LPT) table 200, which can be stored, for example, in the associated flash controller memory 142.

Flash management code running on the GPP 132 tracks erased blocks of NAND flash memory system 150 that are ready to be used in ready-to-use (RTU) queues 206, which may be stored, for example, in GPP memory 134. In the depicted embodiment, flash management code running on the GPP 132 maintains one RTU queue 206 per channel (i.e., per data bus), and an identifier of each erased block that is to be reused is enqueued in the RTU queue 206 corresponding to its channel. A build block stripes function 220 performed by flash management code running on the GPP 132 constructs new block stripes for storing data and associated parity information from the erased blocks enqueued in RTU queues 206. The new block stripes are then queued to the flash controller 132 for data placement. Block stripes are preferably formed of blocks residing in different channels, meaning that build block stripes function 220 can conveniently construct a block stripe by drawing each block of the new block stripe from a different RTU queue 206. In general, build block stripes function 220 attempts to construct stripes from blocks of approximately equal health (i.e., expected remaining useful life).

In response to write IOP received from a host, such as a processor system 102, a data placement function 210 of flash controller 140 determines by reference to LPT table 200 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 210 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 220. In a preferred embodiment, the page stripe allocation can be based on the health of the blocks available for allocation and the "heat" (i.e., estimated or measured access frequency) of the LBA of the write data. Data placement function 210 then writes the write data, associated metadata (e.g., cyclic redundancy code (CRC) and error correcting code (ECC) values), and parity information for the page stripe in the allocated page stripe. Flash controller 140 also updates LPT table 200 to associate the physical page(s) utilized to store the write data with the RAID LBA(s). Thereafter, flash controller 140 can access the data to service host read IOPs by reference to LPT table 200.

Once all pages in a block stripe have been written, flash controller 140 places the block stripe into one of occupied block queues 302, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 312. Garbage collector 212 selects particular block stripes for garbage collection based on a number of factors including, for example, the health of the blocks within the block stripes and how much of the data within the erase blocks is invalid. In the illustrated example, garbage collection is performed on entire block stripes, and flash management code running on GPP 132 logs the block stripes ready to be recycled in a relocation queue 204, which can conveniently be implemented in the associated flash controller memory 142 or GPP memory 134.

The flash management functions performed by GPP 132 or flash controller 140 additionally include a relocation function 214 that relocates the data held in block stripes enqueued in relocation queue 204. To relocate such data, relocation function 214 updates LPT table 200 to remove the current association between the logical and physical addresses of the data. In addition, relocation function 214 issues relocation write requests to data placement function 210 to request that the data of the old block stripe be written to a new block stripe in NAND flash memory system 150. Once all still valid data has been moved from the old block stripe, the old block stripe is passed to dissolve block stripes function 216, which decomposes the old block stripe into its constituent blocks, thus disassociating the blocks. Each of the blocks formerly forming the dissolved block stripe is then erased under the direction of flash controller 140 and/or the control circuitry of the relevant flash memory module, and a corresponding program/erase (P/E) cycle count for each erased block is incremented. Based on the health metrics of each erased block (e.g., bit error rate (BER) metrics, uncorrectable errors, P/E cycle count, etc.), each erased block is either retired (i.e., withdrawn from use) by a block retirement function 218 among the flash management functions executed on GPP 132, or alternatively, prepared for reuse by placing the block on the appropriate ready-to-use (RTU) queue 206 in the associated GPP memory 134.

Figure 2:
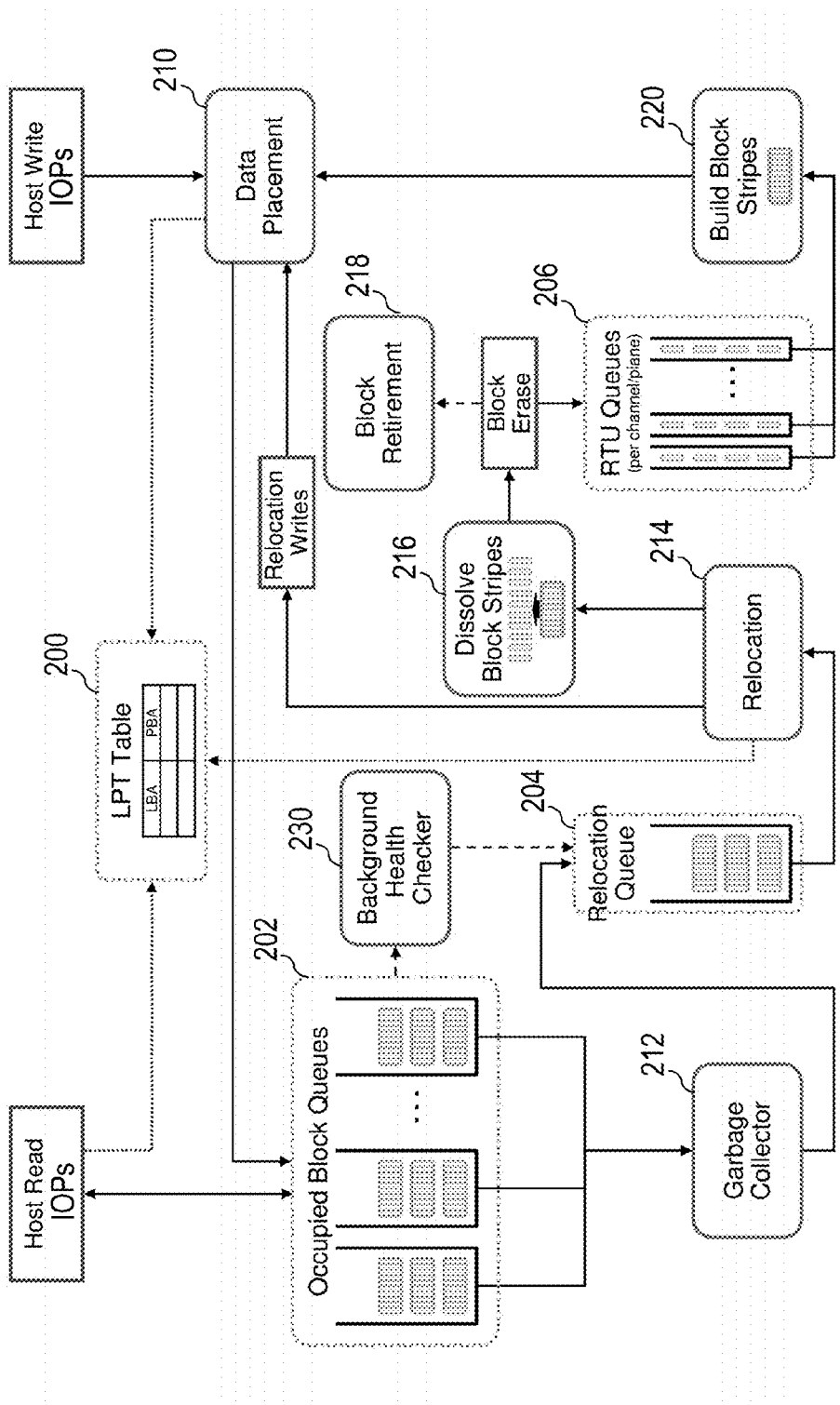
FIG. 2 is a high level flow diagram of the flash management functions and data structures employed in flash management in accordance with one embodiment.

As further shown in FIG. 2, the flash management functions executed on GPP 132 and/or flash controller 140 additionally include a background health checker 230. Background health checker 230, which operates independently of the demand read and write IOPs of hosts such as processor systems 102, continuously determines one or more metrics of health for blocks belonging to block stripes recorded in occupied block queues 202. Based on the one or more of the health metrics, background health checker 230 places block stripes on relocation queue 204 for handling by relocation function 214. Key health metrics preferably monitored and recorded by background health checker relate to the bit error rate (BER) metrics observed for valid blocks and physical pages, and may include, for example, the worst page BER of each block, the mean page BER of each block, the rates of change of the worst page BER and mean page BER of each block, etc.

Figure 3:
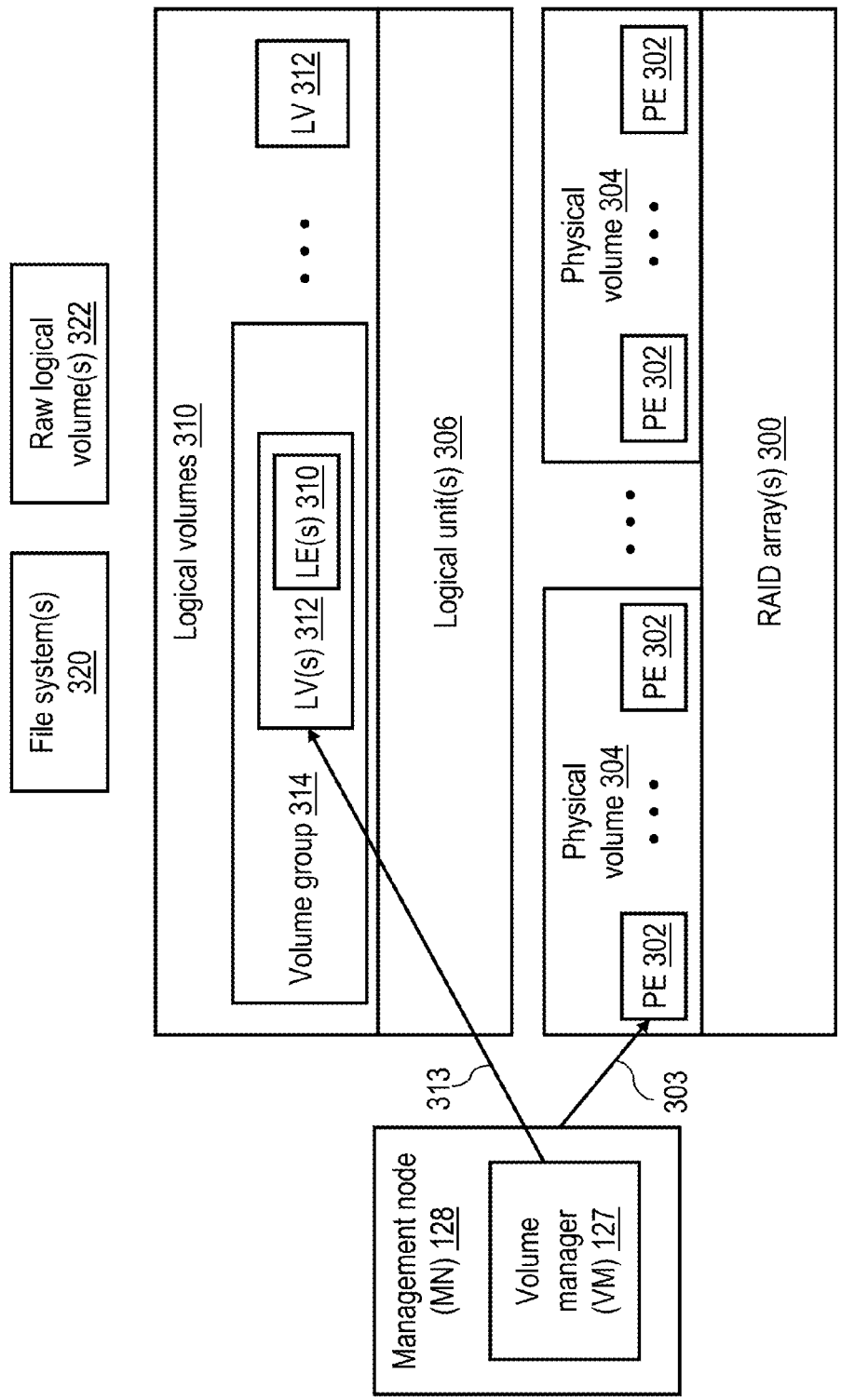
FIG. 3 illustrates logical and physical representations of the storage within a data storage system in accordance with one embodiment.

Referring now to FIG. 3, there is depicted a high level view of the storage provided by data storage system 120 in one embodiment. As noted above, RAID controllers 124 implement one or more RAID arrays 300 over flash cards 126, where each RAID array 300 employs a particular RAID level (e.g., RAID 5 or RAID 6) or a hybrid RAID level (e.g., RAID 10 or RAID 50). The physical storage within RAID array(s) 300 includes a plurality of physical extents 302 formed of physical blocks of storage provided by flash cards 126. Each physical extent 302 is defined by a respective range of contiguous physical addresses, which can be striped across multiple flash cards 126. As generally indicated by arrow 303 and as described further below, management node 128 employs optimized thin provisioning to allocate physical extents 302 having differing grain sizes based on write access patterns. Multiple physical extents 302 can optionally be managed by management node 128 as a single physical volume 304, and management node 128 can implement multiple physical volumes 304 within data storage system 120.

Management node 128 virtualizes the available physical storage within data storage system 120 as one or more logical units 306. For example, in one embodiment, management node 128 may provide each host with one or more respective logical units 306 each accessed by an associated LUN. The volume manager 127 running on management node 128 may further present the logical unit(s) 306 to software executing on hosts as one or more logical volumes 312, where the instantiation of a logical volume 312 is generally illustrated by arrow 313. Each such logical volume 312 comprises one or more logical extents 310 each defined by a respective contiguous range of logical unit LBAs. The underlying physical extents 302, if any, provisioned by management node 128 for a given logical volume 312 may be drawn from the same and/or different physical volumes 304. Volume manager 127 may optionally manage collections of one or more logical volumes 312 as a volume group 314. Depending on the desired implementation, logical volumes 312 may be presented to the software executing on hosts as one or more file systems 320 or raw logical volumes 322.

Figure 4:
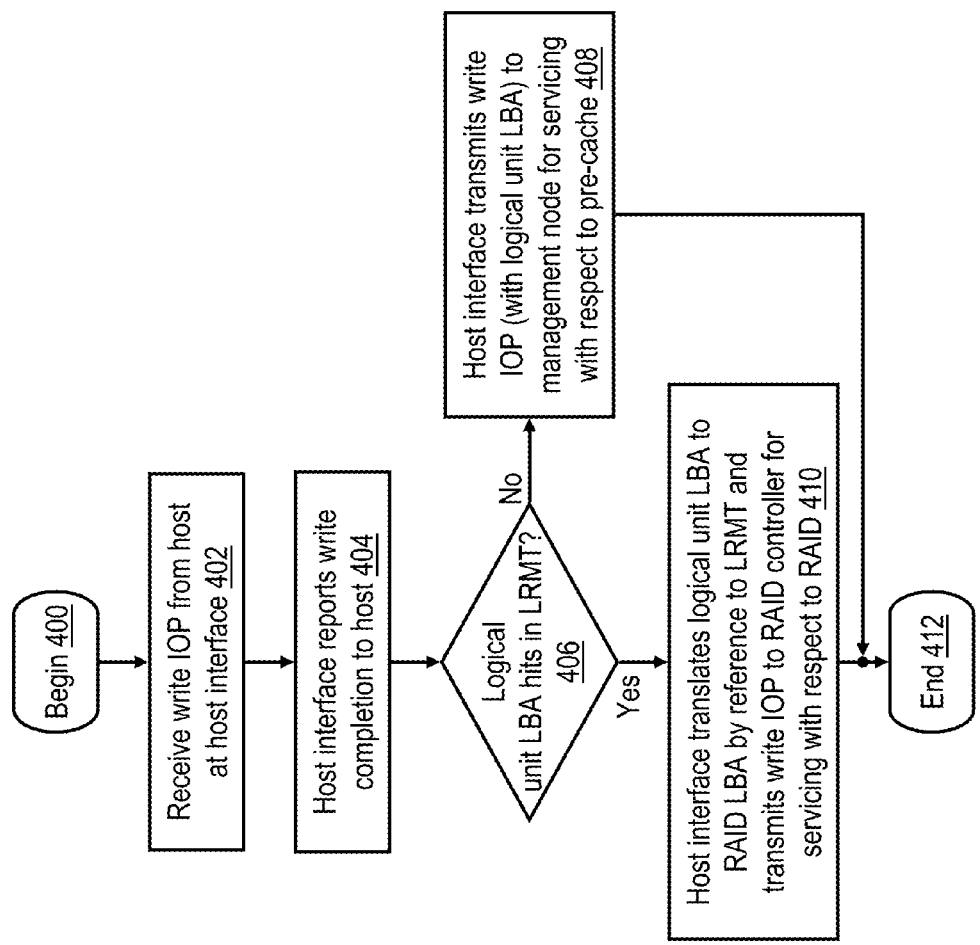
FIG. 4 is a high level logical flowchart of an exemplary process for servicing write input/output operations (IOPs) in a data storage system employing thin provisioning in accordance with one embodiment.

With reference now to FIG. 4, there is illustrated a high level logical flowchart of an exemplary process for servicing write IOPs in a data storage system 120 employing thin provisioning in accordance with one embodiment.

The process of FIG. 4 begins at block 400 and then proceeds to block 402, which illustrates a host interface 122 of data storage system 120 receiving a write IOP from a host, such as a processor system 102, via an I/O channel 110. As noted above, the write IOP specifies, among other things, a transaction type (e.g., a write), a target logical unit LBA, and the write data to be written to data storage system 120. As indicated at block 404, host interface 122 reports write completion to the host that issued the write IOP in order to permit the thread that issued the write IOP to continue its processing. The write completion, which host interface 122 may transmit after verifying acceptance of the write IOP by management node 128, volume manager 127, or a RAID controller 124, is preferably transmitted to the host in advance of actual servicing of the write IOP by storing the write data to flash card(s) 126. If implemented in a high availability storage system, block 404 may include a verification that the write data is buffered on two separate physical memory assemblies so that if one fails the other can still maintain a copy of the write data. As described above, such memory assemblies may additionally be implemented with an alternative power source (e.g., a battery) to prevent loss of the write data in the event of an interruption in the primary power source of data storage system 120.

As shown at block 406, host interface 122 additionally determines whether or not the logical unit LBA hits in its LMRT 123, meaning that management node 128 has already provisioned a physical extent corresponding to the logical unit LBA. In response to a determination that the logical unit LBA hits in LMRT 123, host interface 122 translates the logical unit LBA into a RAID LBA by reference to LMRT 123 and transmits the write IOP (with the RAID LBA) to a RAID controller 124 for servicing (block 410). In response to receipt of the write IOP, the RAID controller 124 stores the write data specified by the write IOP to the RAID using the RAID LBA. Following block 410, the process of FIG. 4 ends at block 412.

Returning to block 406, in response to determining that the logical unit LBA of the write IOP misses in the LMRT 123, the process proceeds to block 408. Block 408 depicts host interface 122 transmitting the write IOP (including the logical unit LBA) to management node 128 for servicing with respect to pre-cache 129. In response to receipt of the write IOP, management node 128 stores the write data in a write record in pre-cache 129. It should be noted in this regard that management node 128 does not immediately provision physical storage for the write data in RAID arrays 300 in response to receipt of the write IOP, but defers thin provisioning of physical storage within RAID arrays 300 for the write data in order to optimize selection of the grain size to be allocated, as described in greater detail below with reference to FIG. 6. Following block 408, the process of FIG. 4 ends at block 412.

Figure 5:
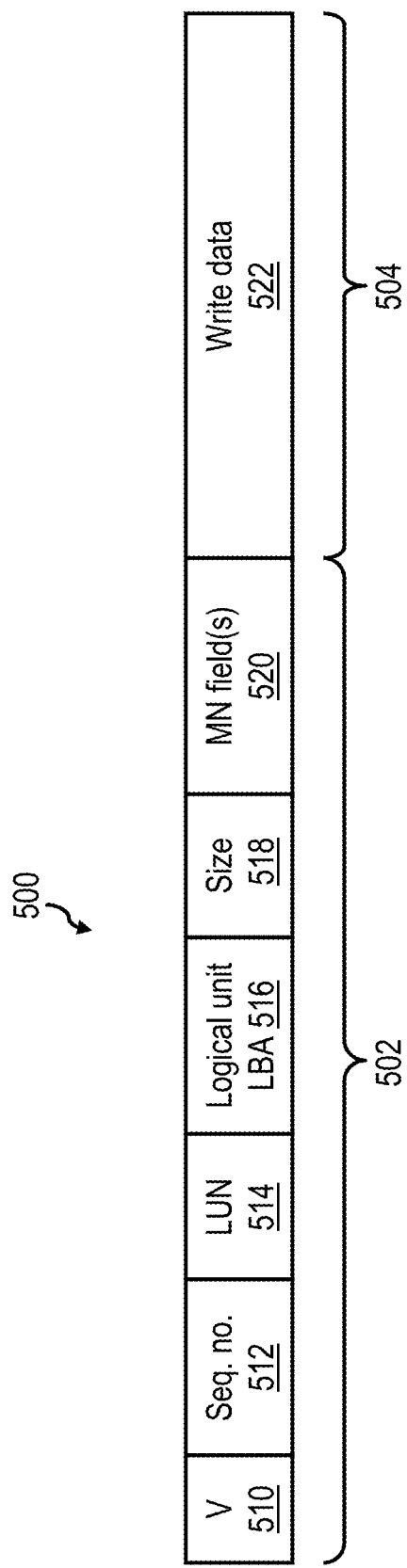
FIG. 5 depicts an exemplary write record in a pre-cache in accordance with one embodiment.

Referring now to FIG. 5, there is depicted an exemplary write record 500 within pre-cache 129 in accordance with one embodiment. In the depicted embodiment, write record 500 includes a header 502 and a payload 504. Header 502 includes a valid bit 510 that indicates whether or not write record 500 contains valid information and a sequence number field 512 that management node 128 updates to record the order of update to write record 500. In addition, header 502 includes a LUN field 514 that specifies the LUN of the target logical unit, a logical unit LBA field 516 that specifies that target logical unit LBA to which the write data is to be written, and a size field 518 that indicates the size of the write. Header 502 may optionally further include one or more management node fields 520 that may be utilized by management node 520 to record additional metadata regarding write record 500 and/or the associated write IOP.

Payload 504 of write record 500 includes a write data field 522 that stores the write data specified by the write IOP. The size of write data field 522, which can vary between write records, is specified by size field 518.

Figure 6:
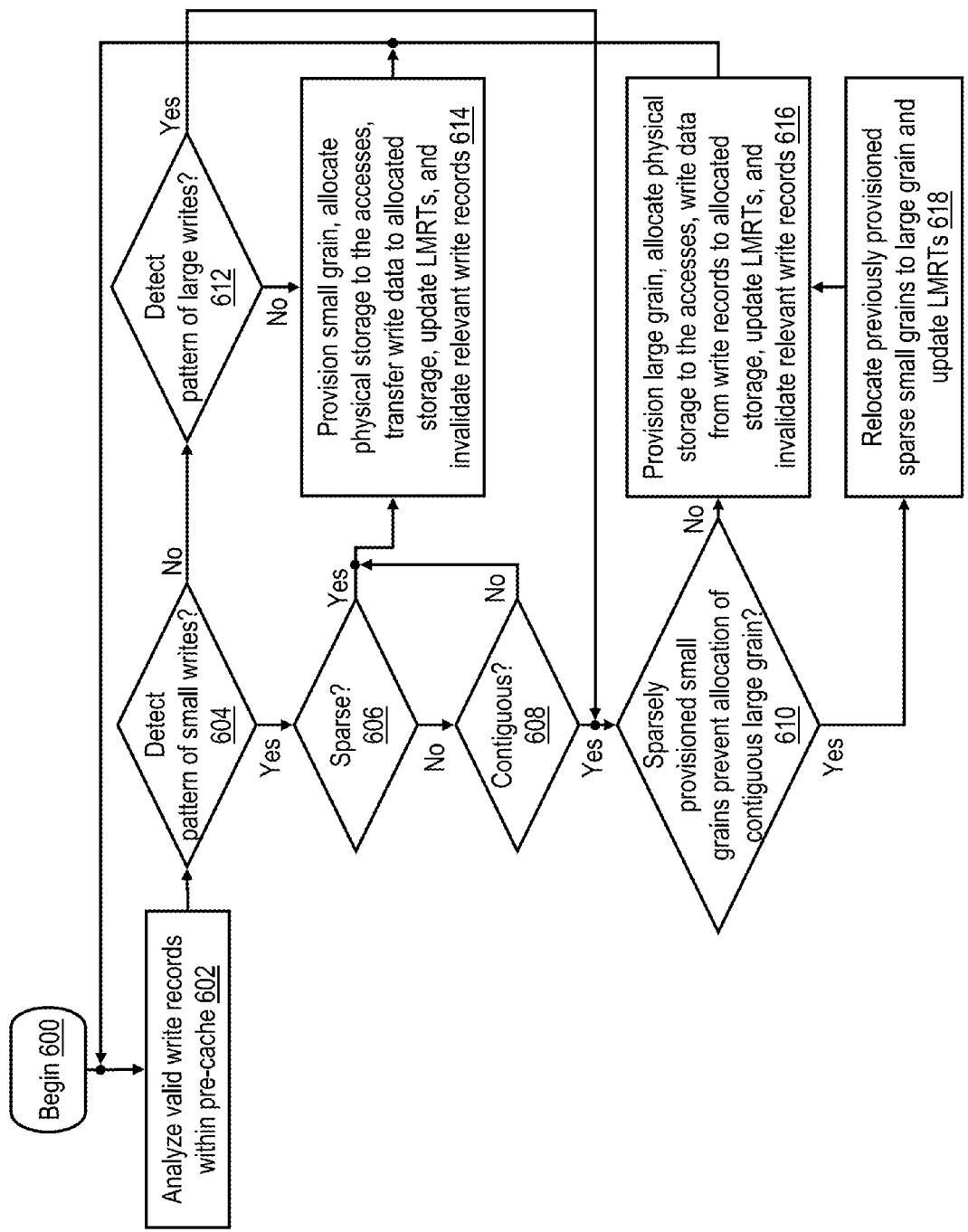
FIG. 6 is a high level logical flowchart of an exemplary process for thin provisioning in a data storage system in accordance with one embodiment.

With reference now to FIG. 6, there is illustrated a high level logical flowchart of an exemplary process for thin provisioning in a data storage system in accordance with one embodiment. In one embodiment, the process of FIG. 6 is performed by management node 128 through execution of volume manager 127. Volume manager 127 may execute the process of FIG. 6 to maintain the average and/or worst case pendency of write records 500 in pre-cache 129 at or below a desired time period. Alternatively or additionally, volume manager 127 may execute the process of FIG. 6 to maintain pre-cache 127 at or below a threshold fill level, for example, as defined by the number and/or the aggregate size of the valid write records 500 within pre-cache 129.

The process of FIG. 6 begins at block 600 and then proceeds to block 602, which illustrates management node 128 analyzing the valid write records 500 currently held within pre-cache 129 to detect access patterns in the writes. At block 604, management node 128 determines whether or not the analysis performed at block 602 has detected a set of write records 500 defining a pattern of writes of small sizes (e.g., as indicated by size fields 518) directed to a common logical extent 310. In various embodiments, differing lower threshold sizes can be utilized to define writes having small sizes, and the lower threshold size can be dynamically varied by volume manager 127, for example, based on the amount of available physical storage and/or low level health information reported by background health checkers 230. Further, in various embodiments, differing numbers of small writes can be utilized to define detection of a pattern of small writes, and the number of small writes can be dynamically varied by volume manager 127. For example, in one exemplary embodiment, a lower threshold size utilized to define a small write can be 16 kilobytes (kB), and the number of writes utilized to define a pattern of small writes can be at least 3. In response to a determination that a pattern of small writes to a common logical extent 310 has not been detected, the process proceeds from block 604 to block 612, which is described below. However, in response to a determination that a pattern of small writes to a common logical extent 310 has been detected, management node 128 determines at block 606 whether or not the pattern of small writes sparsely populate the logical extent 310. For example, management node 128 may determine that the pattern of small writes sparsely populate the logical extent 310 if none of the small writes within the pattern of small writes target contiguous ranges of logical unit LBAs.

In response to a determination at block 606 that the detected pattern of small writes sparsely populate the logical extent 310, the process of FIG. 6 proceeds to block 614. At block 614, management node 128 provisions a physical extent 302 having a small grain size. In various embodiments, the small grain size can differ, and in some embodiments, the small grain size can be varied dynamically by volume manager 127. It is presently preferred, however, in embodiments in which RAID array(s) 300 employ striping if the small grain size is restricted to being smaller than the size of a RAID stripe. For example, in one preferred embodiment, the small grain size can be 512 kB. In addition, at block 614, volume manager 127 allocates physical storage within a RAID array 300 for the provisioned physical extent 302, thus associating the physical extent with a particular range of RAID LBAs. Volume manager 127 then issues one or more write requests specifying RAID LBAs within the allocated physical extent to transfer the write data from the write data fields 522 of the write records 500 associated with the detected pattern of small writes to the allocated physical storage. It should be appreciated that in response to the write request(s) individual flash cards 126 may optionally store the write data in cache 156 in addition to or rather than to the allocated physical storage in NAND flash memory system(s) 150. As further indicated at block 614, volume manager 127 additionally updates LRMTs 123 with appropriate mapping between the logical unit LBA of the logical extent 310 containing the logical LBAs specified by the small writes and the RAID LBA of the allocated physical extent. Finally, volume manager 127 marks the write records 500 associated with the detected pattern of small writes as invalid by resetting their valid fields 510. Thereafter, the process returns to block 602, which illustrates volume manager 127 continuing to analyze the valid write records 500 in pre-cache 129.

Returning to block 606, in response to a negative determination, the process proceeds to block 608, which illustrates volume manager 127 determining whether or not all (or a threshold number) of the writes comprising the detected pattern of small writes target contiguous logical unit LBA ranges. In response to a negative determination at block 608, meaning that the target addresses of the pattern of small writes are neither sparse nor contiguous, the process passes to block 614, which has been described. In response, however, to a determination at block 608 that the target logical unit LBAs of the detected pattern of small writes identify contiguous address ranges, the process passes to block 610.

Block 610 depicts volume manager 127 determining whether or not sparsely provisioned small grains within a RAID array 300 prevent allocation of a contiguous physical extent having a large grain size. This situation can arise, for example, if the work load of one or more hosts includes a large number of random rather than sequential accesses. In response to a negative determination at block 610, the process of FIG. 6 passes to block 616, which is described below. In response to an affirmative determination at block 610, the process proceeds to block 618.

Block 618 illustrates volume manager 127 relocating the previously provisioned sparse physical extents of small grain size to a newly provisioned physical extent of large grain size and updating LRMTs 618 accordingly. To accomplish the relocation, volume manager 127 may issue one or more requests that invoke operation of the relocation functions 214 of one or more flash cards 126. These request(s) are communicated through RAID controllers 124, which are designed to maintain coherency as data is relocated. If an update to data being relocated is received during the relocation operation, a RAID controller 124 can use any of multiple well known techniques to maintain coherency. For example, the RAID controller 124 can maintain coherency by (1) holding off the write request until the relocation operation completes, (2) accepting the write data of the write request into pre-cache 129 during the relocation operation and then preventing destaging of the write data to a flash card 126 until the relocation operation completes, or (3) merging the write data with the data being relocated. Having thus consolidated the physical extents of small grain size that prevent allocation of a contiguous physical extent of large grain size, the process passes from block 618 to block 616.

Referring now to block 616, management node 128 provisions a physical extent 302 having a large grain size for the detected pattern of writes. In various embodiments, the large grain size can differ, and in some embodiments, the large grain size can be varied dynamically by volume manager 127. It is presently preferred, however, in embodiments in which RAID array(s) 300 employ striping if the large grain size is restricted to sizes at least as large as the size of a RAID stripe. For example, in one preferred embodiment, the large grain size can be 16 MB. In addition, at block 616, volume manager 127 allocates physical storage within a RAID array 300 for the provisioned physical extent 302, thus associating the physical extent with a particular range of RAID LBAs. Volume manager 127 then issues one or more write requests specifying RAID LBAs within the allocated physical extent to transfer the write data from the write data fields 522 of the write records 500 associated with the detected pattern of writes to the allocated physical storage. It should be appreciated that in response to the write request(s) individual flash cards 126 may optionally store the write data in cache 156 in addition to or rather than to the allocated physical storage in NAND flash memory system(s) 150. As further indicated at block 610, volume manager 127 additionally updates LRMTs 123 with appropriate mapping between the logical unit LBA of the logical extent 310 containing the logical LBAs specified by the pattern of writes and the RAID LBA of the allocated physical extent. Finally, volume manager 127 marks the write records 500 associated with the detected pattern of writes as invalid by resetting their valid fields 510. Thereafter, the process returns to block 602, which illustrates volume manager 127 continuing to analyze the valid write records 500 in pre-cache 129.

Referring now to block 612, management node 128 determines whether or not the analysis performed at block 602 has detected a set of write records 500 defining a pattern of writes of large sizes (e.g., as indicated by size fields 518) directed to a common logical extent 310. In various embodiments, differing upper threshold sizes can be utilized to define writes having large sizes, and the upper threshold size can be dynamically varied by volume manager 127, for example, based on the amount of available physical storage and/or low level health information reported by background health checkers 230. Further, in various embodiments, differing numbers of large writes can be utilized to define detection of a pattern of large writes, and the number of large writes can be dynamically varied by volume manager 127. For example, in one exemplary embodiment, a upper threshold size utilized to define a large write can be 128 kilobytes (kB), and the number of writes utilized to define a pattern of small writes can be at least 3. In response to a determination that a pattern of large writes to a common logical extent 310 has not been detected, the process proceeds from block 604 to block 614, which illustrates management node 128 thin provisioning physical storage for the analyzed write records 500 utilizing a small grain size as previously described. However, in response to a determination that a pattern of large writes to a common logical extent 310 has been detected, the process proceeds from block 612 to block 610 and following blocks, which illustrate management node 128 thin provisioning physical storage for the detected pattern of large writes in the manner previously described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, in at least one embodiment, a data storage system includes a pre-cache and a plurality of storage devices across which a data storage array is distributed. In response to receipt of a write request specifying a logical address and write data, the data storage system buffers the write request among a plurality of write requests in the pre-cache without provisioning in the data storage array a physical extent corresponding to the logical address. A management node analyzes the plurality of write requests buffered in the pre-cache. In response to the analyzing identifying a first pattern of write requests, the management node provisions, in the data storage array, a first physical extent having a smaller grain size and destages the write data to the first physical extent. In response to the analyzing identifying a second pattern of write requests, the management node provisions a second physical extent having a larger grain size and destages the write data from the pre-cache to the second physical extent.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transitory propagating media per se.

In addition, although embodiments have been described that include use of a NAND flash memory, it should be appreciated that embodiments of the present invention can also be used with any other type of non-volatile random access memory (NVRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of thin provisioning physical storage in a data storage system including a pre-cache and a plurality of storage devices across which a data storage array is distributed, the method comprising:

in response to receiving, from a host, a write request specifying a logical address and write data, the data storage system sending acknowledgment of the write request to the host and buffering the write request as one of a plurality of write requests concurrently buffered in the pre-cache without provisioning, in the data storage array, a physical extent corresponding to the logical address;

a management node, prior to provisioning in the data storage array any physical extent for the plurality of write requests, analyzing at least sizes of the plurality of write requests concurrently buffered in the pre-cache;

the management node thin provisioning physical extents in the data storage array on an as-needed basis based on the analyzing, wherein the thin provisioning includes:

in response to the analyzing identifying a first pattern of write requests in the plurality of write requests, the management node provisioning, in the data storage array, a first physical extent having a smaller grain size and destaging write data of the plurality of write requests from the pre-cache to the first physical extent;

in response to the analyzing identifying a second pattern of write requests in the plurality of write requests, the management node provisioning, in the data storage array, a second physical extent having a larger grain size and destaging write data of the plurality of write requests from the pre-cache to the second physical extent; and repeating the buffering, analyzing and thin provisioning for each subsequent plurality of write requests received from the host and buffered in the pre-cache.

2. The method of claim 1, wherein the first pattern of write requests includes a plurality of write requests that are identified as having a small amount of write data and that target non-contiguous logical addresses.

3. The method of claim 1, wherein the second pattern of write requests includes a plurality of write requests that are identified as having a small amount of write data and that target contiguous logical addresses.

4. The method of claim 1, wherein the buffering includes buffering the write request in the pre-cache only in response to determining that a physical extent corresponding to the logical address has not yet been allocated in the data storage array.

5. The method of claim 4, wherein:
the data storage system includes an address translation table; and
the method further comprises determining that a physical extent corresponding to the logical address has not yet been allocated in the data storage array based on the logical address missing in the address translation table.

6. The method of claim 1, and further comprising:
prior to provisioning the second physical extent, relocating, within the data storage array, data stored within one or more previously provisioned physical extents having the smaller grain size, wherein physical storage within the one or more previously provisioned physical extents is included within the second physical extent.

7. The method of claim 1, wherein:
the data storage system stripes data stored within the data storage array across the plurality of storage devices; and
the larger grain size is at least as large as a size of a data stripe within the data storage array.

8. The method of claim 1, wherein the management node performs the analyzing and provisioning through operation of a logical volume manager that presents the physical storage of the data storage array to hosts as one or more logical volumes.

9. The method of claim 1, wherein the thin provisioning includes the management node determining a frequency of provisioning based on a pendency of write requests in the pre-cache.

10. A data storage system, comprising:
a pre-cache;
a management node that manages a plurality of storage devices across which a data storage array is distributed, wherein the management node is configured to perform:
in response to the data storage system receiving, from a host, a write request specifying a logical address and write data, sending acknowledgement of the write request to the host and buffering the write request as one of a plurality of write requests concurrently buffered in the pre-cache without provisioning, in the data storage array, a physical extent corresponding to the logical address;
analyzing, prior to provisioning in the data storage array any physical extent for the plurality of write requests, at least sizes of the plurality of write requests buffered in the pre-cache;
thin provisioning physical extents in the data storage array on an as-needed basis based on the analyzing, wherein the thin provisioning includes:
in response to the analyzing identifying a first pattern of write requests in the plurality of write requests, the management node provisioning, in the data storage array, a first physical extent having a smaller grain size and destaging write data of the plurality of write requests from the pre-cache to the first physical extent;
in response to the analyzing identifying a second pattern of write requests in the plurality of write requests, the management node provisioning, in the data storage array, a second physical extent having a larger grain size and destaging write data of the plurality of write requests from the pre-cache to the second physical extent; and
repeating the buffering, analyzing and thin provisioning for each subsequent plurality of write requests received from the host and buffered in the pre-cache.

11. The data storage system of claim 10, wherein the first pattern of write requests includes a plurality of write requests that are identified as having a small amount of write data and that target non-contiguous logical addresses.

12. The data storage system of claim 10, wherein the second pattern of write requests includes a plurality of write requests that are identified as having a small amount of write data and that target contiguous logical addresses.

13. The data storage system of claim 10, wherein the buffering includes buffering the write request in the pre-cache only in response to a determination that a physical extent corresponding to the logical address has not yet been allocated in the data storage array.

14. The data storage system of claim 13, wherein:
the data storage system includes an address translation table; and
the data storage system determines that a physical extent corresponding to the logical address has not yet been allocated in the data storage array based on the logical address missing in the address translation table.

15. The data storage system of claim 10, wherein the management node is further configured to perform:
prior to provisioning the second physical extent, relocating, within the data storage array, data stored within one or more previously provisioned physical extents having the smaller grain size, wherein physical storage within the one or more previously provisioned physical extents is included within the second physical extent.

16. The data storage system of claim 10, wherein:
the data storage system stripes data stored within the data storage array across the plurality of storage devices; and
the larger grain size is at least as large as a size of a data stripe within the data storage array.

17. The data storage system of claim 10, wherein the management node performs the analyzing and provisioning through operation of a logical volume manager that presents the physical storage of the data storage array to hosts as one or more logical volumes.

18. The data storage system of claim 10, and further comprising the plurality of storage devices across which the data storage array is distributed.

19. A program product for thin provisioning physical storage in a data storage system including a pre-cache and a plurality of storage devices across which a data storage array is distributed, the program product comprising:

a data storage device; and program code stored within the data storage device, wherein the program code, when executed by a processor of a management node of the data storage system, causes the management node to perform:

in response to the data storage system receiving, from a host, a write request specifying a logical address and write data, sending an acknowledgement of the write request to the host and buffering the write request as one of a plurality of write requests concurrently buffered in the pre-cache without provisioning, in the data storage array, a physical extent corresponding to the logical address;

analyzing, prior to provisioning in the data storage array any physical extent for the plurality of write requests, at least sizes of the plurality of write requests concurrently buffered in the pre-cache;

thin provisioning physical extents in the data storage array on an as-needed basis based on the analyzing, wherein the thin provisioning includes:

in response to the analyzing identifying a first pattern of write requests in the plurality of write requests, provisioning, in the data storage array, a first physical extent having a smaller grain size and destaging write data of the plurality of write requests from the pre-cache to the first physical extent;

in response to the analyzing identifying a second pattern of write requests in the plurality of write requests, provisioning, in the data storage array, a second physical extent having a larger grain size and destaging write data of the plurality of write requests from the pre-cache to the second physical extent; and repeating the buffering, analyzing and thin provisioning for each subsequent plurality of write requests received from the host and buffered in the pre-cache.

20. The program product of claim 19, wherein the first pattern of write requests includes a plurality of write requests that are identified as having a small amount of write data and that target non-contiguous logical addresses.

21. The program product of claim 19, wherein the second pattern of write requests includes a plurality of write requests that are identified as having a small amount of write data and that target contiguous logical addresses.

22. The program product of claim 19, wherein the buffering includes buffering the write request in the pre-cache only in response to determining that a physical extent corresponding to the logical address has not yet been allocated in the data storage array.

23. The program product of claim 22, wherein:

the data storage system includes an address translation table; and the program code, when executed by the processor, further causes the management node to perform:

determining that a physical extent corresponding to the logical address has not yet been allocated in the data storage array based on the logical address missing in the address translation table.

24. The program product of claim 19, wherein the program code, when executed by the processor, further causes the management node to perform:

prior to provisioning the second physical extent, relocating, within the data storage array, data stored within one or more previously provisioned physical extents having the smaller grain size, wherein physical storage within the one or more previously provisioned physical extents is included within the second physical extent.

25. The program product of claim 19, wherein:

the data storage system stripes data stored within the data storage array across the plurality of storage devices; and the larger grain size is at least as large as a size of a data stripe within the data storage array.

26. The program product of claim 19, wherein the management node performs the analyzing and provisioning through operation of a logical volume manager that presents the physical storage of the data storage array to hosts as one or more logical volumes.

* * * * *